(12) United States Patent
Yanagi

(10) Patent No.: US 7,656,451 B2
(45) Date of Patent: Feb. 2, 2010

(54) CAMERA APPARATUS AND IMAGING METHOD

(75) Inventor: Kazunori Yanagi, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 356 days.

(21) Appl. No.: 11/654,411

(22) Filed: Jan. 17, 2007

(65) Prior Publication Data

US 2007/0171282 A1 Jul. 26, 2007

(30) Foreign Application Priority Data

Jan. 18, 2006 (JP) ............................. 2006-009889

(51) Int. Cl.
*H04N 5/222* (2006.01)
(52) U.S. Cl. .................... 348/333.11; 348/333.05
(58) Field of Classification Search ................
348/333.11–333.12, 333.05
See application file for complete search history.

(56) References Cited

U.S. PATENT DOCUMENTS

| | | | | |
|---|---|---|---|---|
| 6,310,648 | B1 * | 10/2001 | Miller et al. | 348/333.05 |
| 6,344,907 | B1 * | 2/2002 | Watanabe et al. | 358/448 |
| 6,914,624 | B1 | 7/2005 | Esquibel et al. | |
| 7,119,841 | B1 * | 10/2006 | Sako | 348/333.05 |
| 7,139,738 | B2 * | 11/2006 | Philomin et al. | 706/14 |
| 7,474,348 | B2 * | 1/2009 | Suzuki et al. | 348/333.05 |
| 7,480,002 | B2 * | 1/2009 | Goh et al. | 348/333.05 |
| 2004/0165085 | A1 * | 8/2004 | Shibutani | 348/231.3 |

FOREIGN PATENT DOCUMENTS

| | | |
|---|---|---|
| JP | 2004-254256 A | 9/2004 |
| JP | 2005-229326 A | 8/2005 |
| JP | 2005229326 * | 8/2005 |
| KR | 2005-32473 A | 4/2005 |

OTHER PUBLICATIONS

Korean Office Action dated Feb. 17, 2009 (4 pages), and English translation thereof (3 pages) issued in counterpart Korean Application No. 10-2007-7029003.

* cited by examiner

*Primary Examiner*—Jason Chan
*Assistant Examiner*—Pritham Prabhakher
(74) *Attorney, Agent, or Firm*—Frishauf, Holtz, Goodman & Chick, P.C.

(57) ABSTRACT

A camera apparatus has an imaging unit, a display unit, a storage unit and a control unit. The imaging unit shoots an object and outputs image data thereof. The display unit displays an image. The storage unit stores shooting conditions. The control unit displays a real-time image based on the image data from the imaging unit together with a plurality of selectable images for identifying a plurality of shot images stored in the storage unit on the display unit; selects an arbitrary one of selectable images displayed on the display unit; sets that shooting condition stored in the storage unit which corresponds to the selectable image selected by the selection unit as a shooting condition for a shooting operation; causes the imaging unit to shoot the object according to the shooting condition set by the setting unit; and records obtained image data in a memory.

7 Claims, 11 Drawing Sheets

FIG. 4

| SCENE NUMBER | 01 | ... | 23 | ... |
|---|---|---|---|---|
| SCENE NAME | PERSON | ... | SCENERY | ... |
| SAMPLE IMAGE | 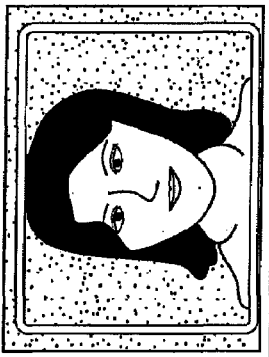 | ... |  | ... |
| SHOOTING CONDITION | FOCUS POSITION: 4<br>SHUTTER SPEED: 1/60<br>APERTURE: 2<br>EV SHIFT AMOUNT: 0<br>SENSITIVITY ASA: 400<br>COLOR BALANCE: STANDARD<br>ENHANCEMENT COLOR. FILL<br>LIGHT: NONE | ... | FOCUS POSITION: 1<br>SHUTTER SPEED: 1/120<br>APERTURE: 2<br>EV SHIFT AMOUNT: 0<br>SENSITIVITY ASA: 100<br>COLOR BALANCE: STANDARD<br>ENHANCEMENT COLOR.FILL<br>LIGHT: NONE | ... |
| SCENE SPECIFYING INFORMATION — OBJECT INFORMATION | OBJECT DISTANCE: CLOSE-UP<br>MOTION OF OBJECT: NONE<br>BRIGHTNESS OF OBJECT: BRIGHT<br>SHOOTING LOCATION: INDOOR | ... | OBJECT DISTANCE: FAR<br>MOTION OF OBJECT: NONE<br>BRIGHTNESS OF OBJECT: BRIGHT<br>SHOOTING LOCATION: OUTDOOR | ... |
| SCENE SPECIFYING INFORMATION — ENVIRONMENTAL INFORMATION | SEASON: NONE<br>SHOOTING TIME: DAYTIME | ... | SEASON: NONE<br>SHOOTING TIME: DAYTIME | ... |
| USE FREQUENCY | 000 | ... | 000 | ... |

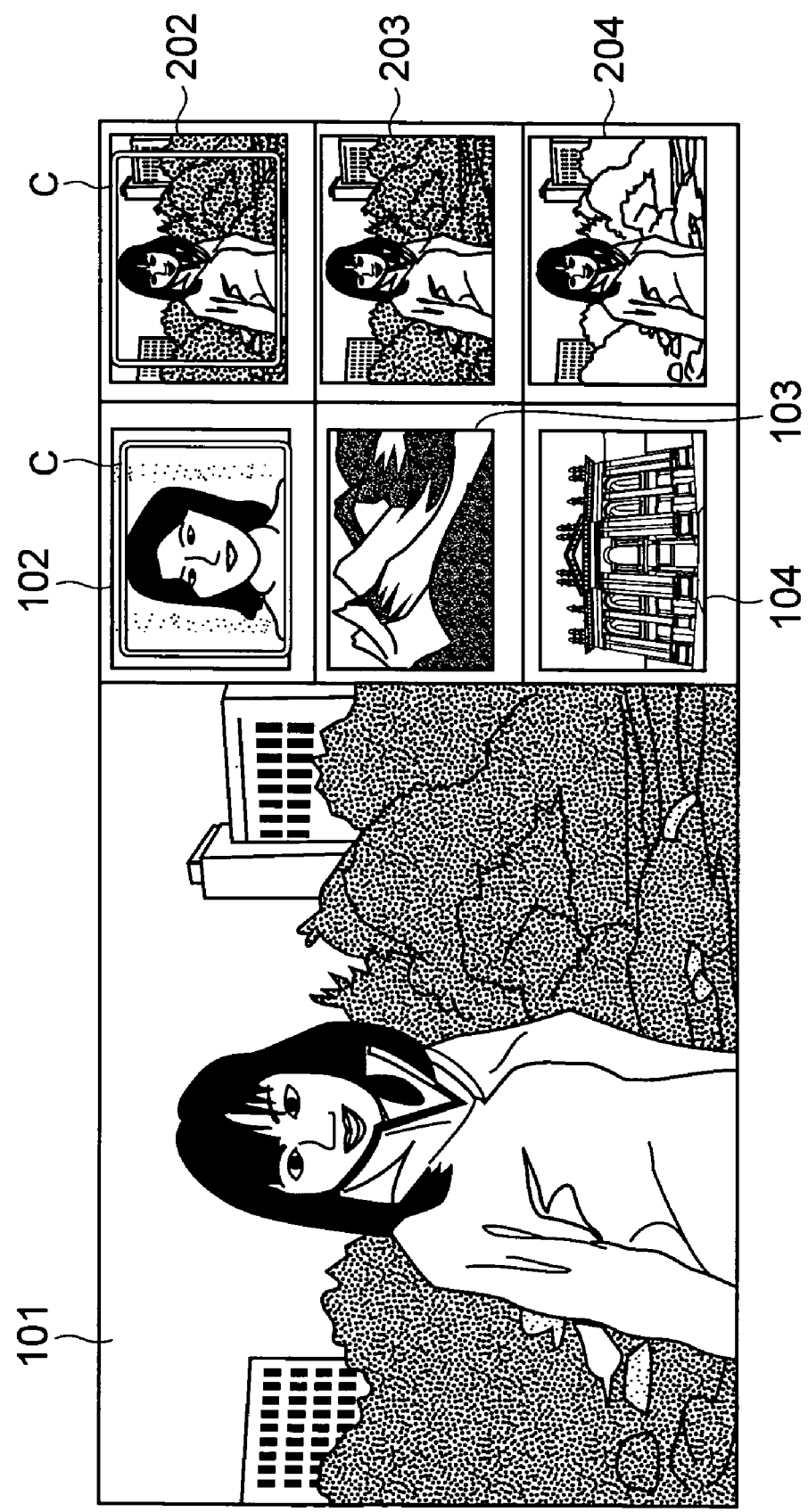

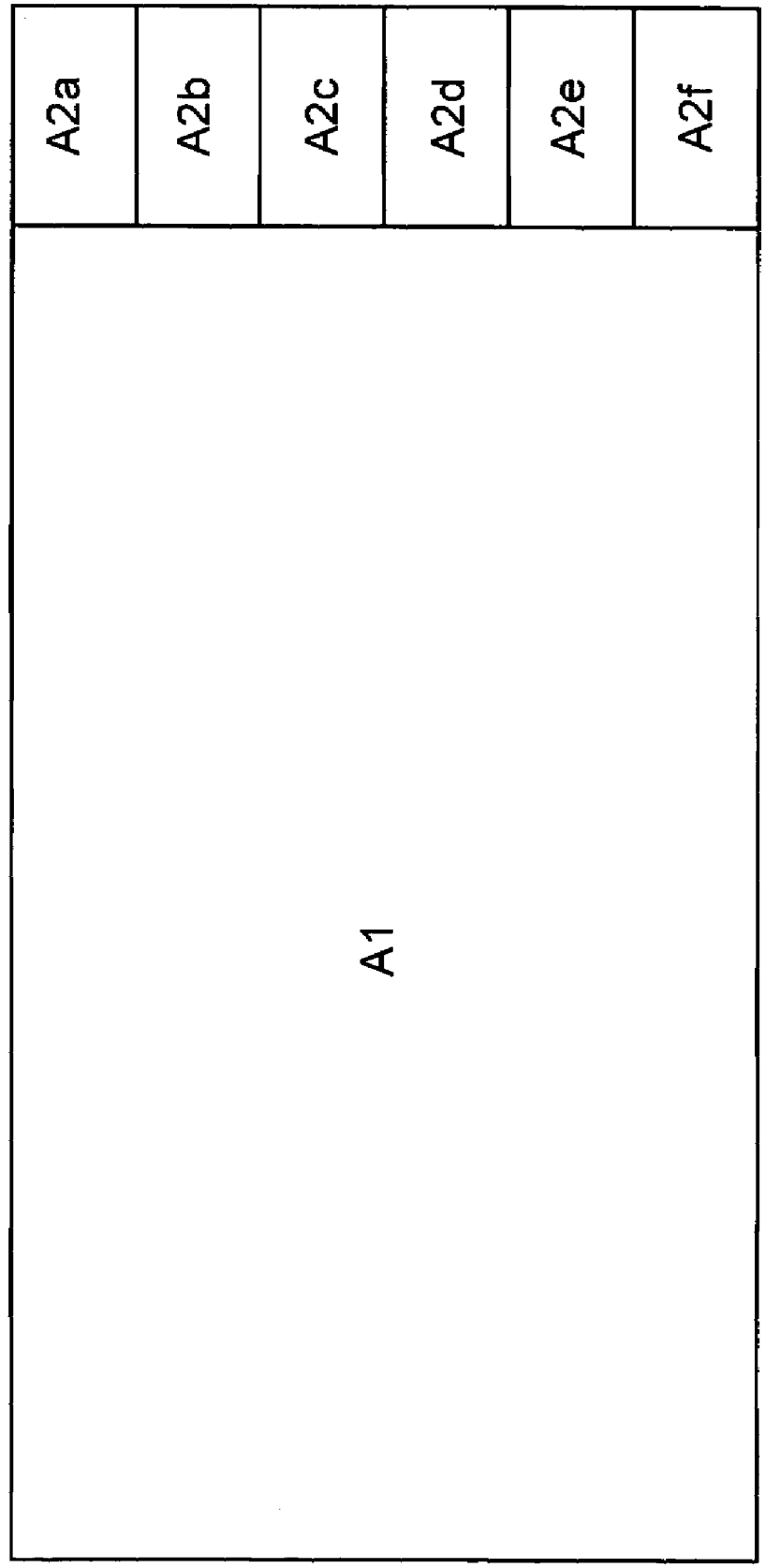

CAMERA APPARATUS AND IMAGING METHOD

BACKGROUND OF THE INVENTION

1. Field of the Invention

The present invention relates to a camera apparatus and an imaging method.

2. Description of the Related Art

There are digital cameras having a scene select function. The scene select function permits a digital camera to store sample images of individual shooting (imaging) scenes, and shooting conditions which match the respective shooting scenes, permits a user to select a sample image which matches a desired shooting scene, and automatically sets the shooting condition corresponding to the selected sample image into the digital camera. The shooting conditions are setting parameters, such as the shutter speed, the aperture value, and the color balance.

Unexamined Japanese Patent Application KOKAI Publications No. 2004-254256 and No. 2005-151375 disclose a digital camera having a function of displaying a through image (a real time image picked-up by an image pick-up device such as a CCD) and a sample image on a monitor at a same time. The digital camera can allow a user to select a sample image while viewing a through image.

Unexamined Japanese Patent Application KOKAI Publication No. 2005-229326 discloses a digital camera having a function of displaying a through image, a sample image and a presumed image on a monitor at a same time. The presumed image indicates a shooting result and is formed by applying to the through image with shooting conditions corresponding to the sample image. The digital camera can allow a user to select a sample image while viewing the through image and the presumed image.

The digital camera can display only one sample image at the same time as a through image. Therefore, the user cannot select a desired sample image while comparing a plurality of sample images with one another. This lowers the operability of the digital camera at the time of setting an intended shooting condition.

SUMMARY OF THE INVENTION

Accordingly, it is an object of the present invention to provide a camera apparatus and an imaging method that can improve the operability when setting a shooting condition.

To achieve the objects, a camera apparatus according to the invention includes:

an imaging unit that shoots an object and outputs image data thereof;

a display unit that displays an image;

a storage unit that stores a plurality of shooting conditions;

a display control unit that displays a real-time image based on the image data from the imaging unit together with a plurality of selectable images for identifying the plurality of shooting conditions stored in the storage unit on the display unit;

a selection unit that selects an arbitrary one of selectable images displayed on the display unit;

a setting unit that sets that shooting condition stored in the storage unit which corresponds to the selectable image selected by the selection unit as a shooting condition for a shooting operation; and a recording unit that causes the imaging unit to shoot the object according to the shooting condition set by the setting unit, and records obtained image data.

To achieve the objects, an imaging method according to the invention includes:

an imaging step of shooting an object and outputting image data thereof;

a display step of displaying a plurality of shooting-condition selection images respectively representing shooting conditions and an image indicated by the image data output in the imaging step on a display screen, at a same time;

a selection step of selecting one of a plurality of shooting-condition selection images displayed on the display screen; and a recording step of shooting the object according to a shooting condition corresponding to the selected shooting-condition selection image, and recording the shot image in a memory.

A computer may be configured to function as the camera apparatus, or a computer program which allows a computer to execute or control the imaging method may be produced and distributed. Such a computer program may be stored on a recording medium for distribution.

BRIEF DESCRIPTION OF THE DRAWINGS

These objects and other objects and advantages of the present invention will become more apparent upon reading of the following detailed description and the accompanying drawings in which:

FIG. 4 is a diagram showing a specific example of scene data;

FIGS. 8A and 8B are diagrams of display examples on the display screen of the monitor, FIG. 8A showing a case where sample images are set as selectable images while FIG. 8B shows a case where simulation images are set as selectable images;

FIG. 9 is a diagram of a display example on the display screen of the monitor, showing a case where sample images and simulation images are displayed together as selectable images;

FIG. 11 is a diagram of another example of displayed images and the display screen of the monitor, showing a case where six selectable images are displayed and the aspect ratio of each image is 9:16.

DETAILED DESCRIPTION OF THE PREFERRED EMBODIMENT

A digital camera 100 according to one embodiment of the present invention will be described below with reference to the accompanying drawings.

The digital camera 100 according to the embodiment has a scene select/shooting function which displays sample images of a plurality of shooting scenes to select shooting conditions on a monitor, and sets a shooting condition corresponding to a sample image selected by a user.

The digital camera 100 has ordinary functions, such as the zoom function, AE (Auto Exposure), and AF (Auto Focus). The AF function employs a well-known contrast detecting system (the function of determining that the state which provides a shot image with the maximum contrast is a focused state).

Figure 1A:
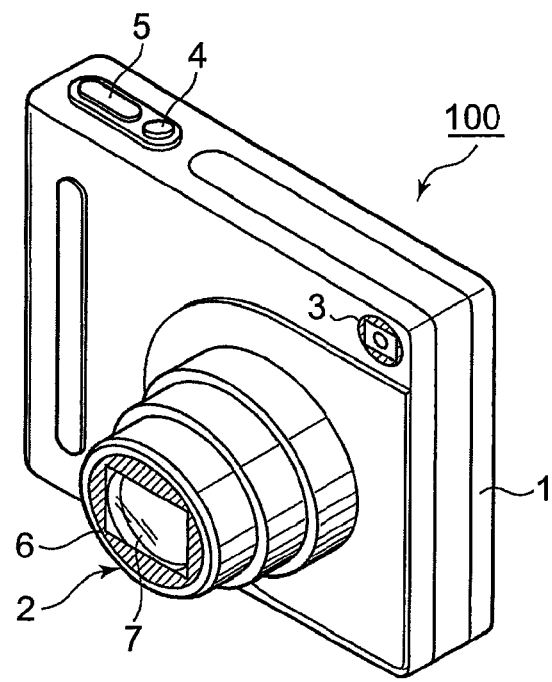
FIGS. 1A and 1B are diagrams showing the outline of a digital camera according to the present invention.

As shown in FIG. 1A, the digital camera 100 has an approximately rectangular, thin camera body 1. A taking lens unit 2, and an optical finder 3 are arranged on the front side of the camera body 1. A power key 4 and a shutter key 5 are arranged on the top side of the camera body 1 on the right-hand end (for the user).

The taking lens unit 2 is of a retractable type, and has a lens-barrel 6 which protracts and retracts in multiple stages. A taking lens 7 including optical lenses constituting a zoom lens and a focus lens is held inside the lens-barrel 6 in such a manner as to be movable in the optical axial direction. A shutter, an aperture, etc. are arranged on the optical axis of the optical lenses. The lens-barrel 6 protracts forward of the camera body 1 as illustrated in FIG. 1A when the digital camera 100 is powered on or when the operational mode is set to a record mode (shooting mode) from another mode with the power on. The lens-barrel 6 is accommodated in the camera body 1 when the digital camera 100 is powered on or when the operational mode is set to a playback mode.

Figure 1B:
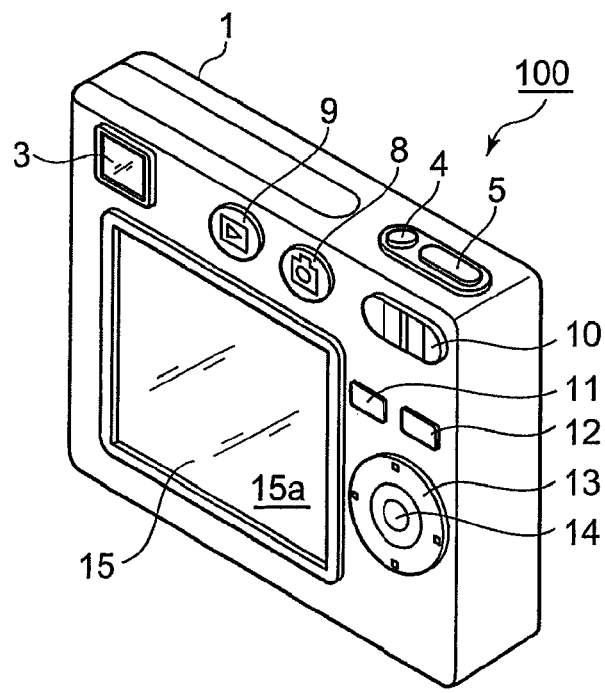

As shown in FIG. 1B, an optical finder 3, a monitor (LCD) 15 and switches are laid out on the back side of the camera body 1. The switches include a REC (Recording) key 8 for setting the record mode, a PB (Playback) key 9 for setting the playback mode, a zoom key 10, a menu key 11, a display key 12, a direction key 13 and a SET key 14.

The REC key 8 sets the digital camera 100 to the record mode for shooting an object and storing the shot image in a memory. The PB key 9 sets the playback mode to display an image recorded in the memory on the monitor 15.

The zoom key 10 adjusts the zoom magnification of the lens.

When operated, the menu key 11 displays an operational menu on the monitor 15.

The display key 12 sets the display on or off.

The direction key 13 is formed in an annular shape and designates any one of up, down, right and left directions. The SET key 14 is disposed in the center of the direction key 13 and is used to, for example, select an item on the menu displayed on the monitor 15, and select (change) and set the setting contents. The direction key 13 and the SET key 14 are used to enable or disable the setting in the record mode and the playback mode. For example, the direction key 13 and the SET key 14 are used to select a desired scene image in scene select mode.

Figure 7:
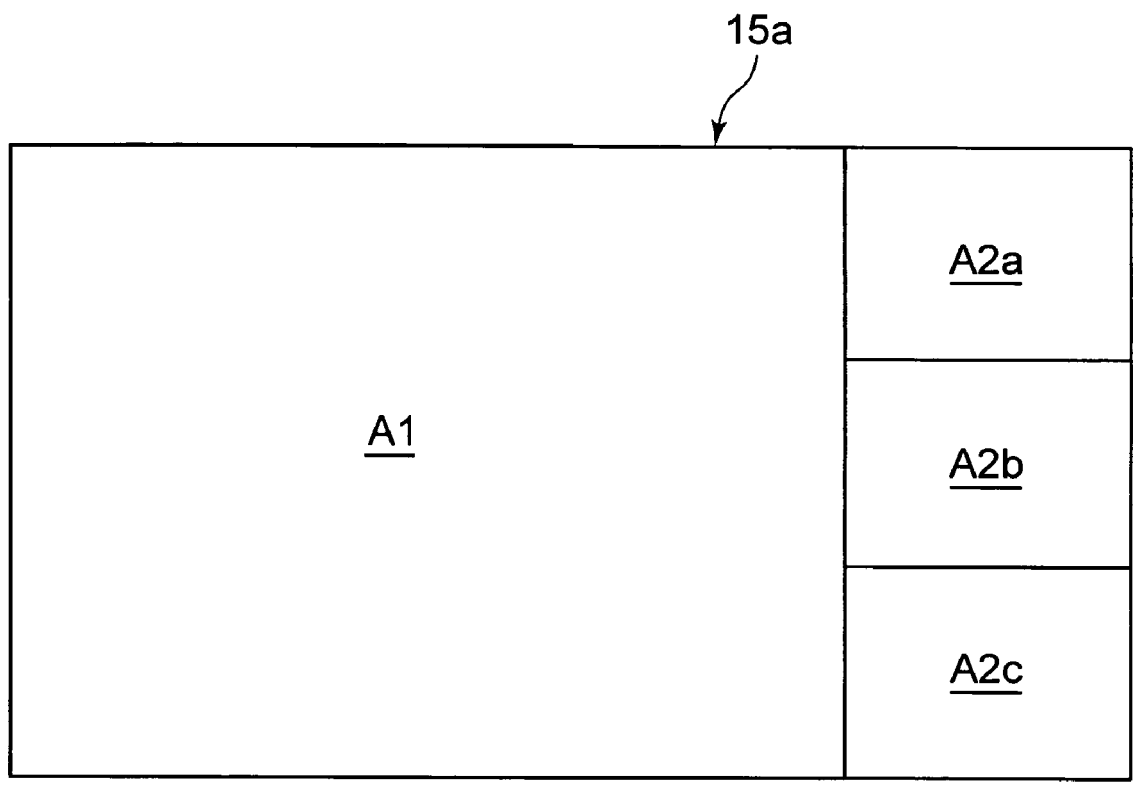
FIG. 7 is a diagram showing a display area secured on the display screen of a liquid crystal monitor in record mode when the scene select mode is set.

The monitor 15 comprises a color liquid crystal display panel with a backlight. For example, the monitor 15 displays various kinds of information, such as the through image of the object (e.g., a real-time image which is being shot by the imaging device but is not recorded) and shooting information at the shooting standby time in record mode. The monitor 15 has a display screen 15a with an aspect ratio of 9:16, laterally larger than the normal screen with an aspect ratio of 3:4. As shown in FIG. 7, a main area A1 with the maximum area, and a first subarea A2a, a second subarea A2b and a third subarea A2c vertically aligned to the right of the main area A1 can be secured on the display screen 15a. The aspect ratios of the areas A1, and A2a to A2c are 3:4.

A card slot or the like (not shown) is provided in the bottom side of the camera body 1. An external memory 31 (shown in FIG. 2), such as a memory card, which is a recording medium to record shot images is detachably loaded into the card slot.

Figure 2:
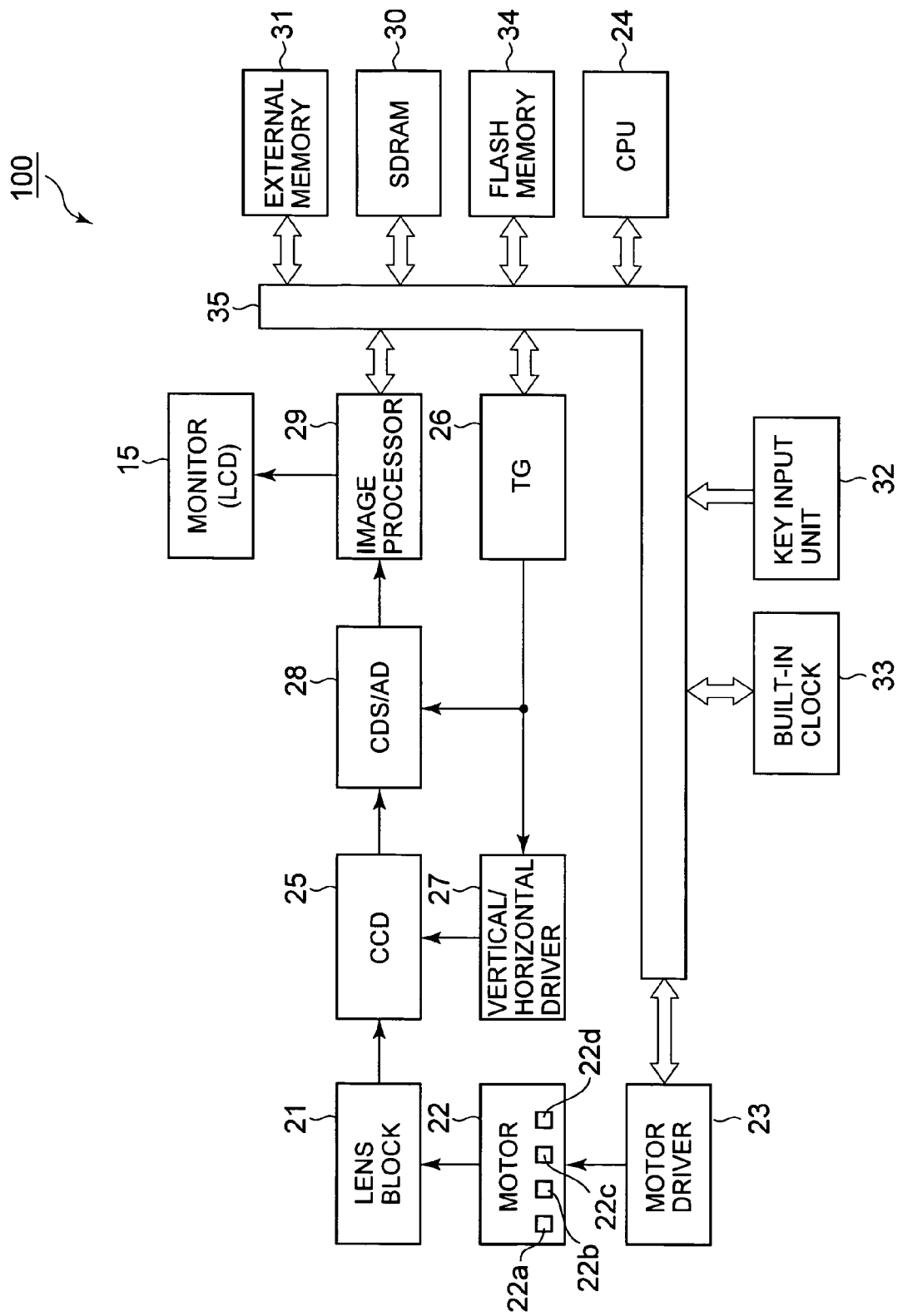
FIG. 2 is a block diagram showing the electric configuration of the digital camera.

FIG. 2 is a block diagram showing the electric configuration of the digital camera 100.

As illustrated in FIG. 2, the digital camera 100 has a lens block 21, motors 22, a motor driver 23, a CPU 24, a CCD 25, a timing generator (TG) 26, a vertical/horizontal driver 27, a signal processing circuit (CDS/AD) 28, an image processor 29, an SDRAM 30, an external memory 31, a key input unit 32, a built-in clock 33, a flash memory 34, and a bus 35.

The lens block 21 includes the lens-barrel 6, the taking lens 7, the shutter and the aperture, and drive mechanisms therefor. The motors 22 has a zoom motor 22a, a focus motor 22b, a shutter motor 22c and an aperture motor 22d disposed in the lens-barrel 6.

The zoom motor 22a and the focus motor 22b drive (move) the lens-barrel 6 and the taking lens 7 in the optical axial direction. The shutter motor 22c drives the shutter. The aperture motor 22d drives the aperture.

The motor driver 23 drives the motors 22a and 22b to control zooming and focusing in response to an instruction from the CPU 24. The motor driver 23 drives the motor 22c to open the shutter for a given time in response to an instruction from the CPU 24. The motor driver 23 also drives the motor 22d to adjust the aperture ratio in response to an instruction from the CPU 24.

The CCD 25 is an imaging device disposed rearward of the taking lens 7 of the lens block 21 in the optical axial direction, and converts the shot image of the object to an analog signal. A CMOS image sensor or the like may be used as the imaging device.

The timing generator 26 generates a timing signal to control the operation of the CCD 25 under the control of the CPU 24.

The vertical/horizontal driver 27 drives the CCD 25 based on the timing signal generated by the timing generator 26, and outputs an analog imaging signal according to the optical image of the object picked up by the CCD 25 to the signal processing circuit 28.

The signal processing circuit 28 includes a CDS (Correlated Double Sampling) circuit which cancels noise contained in the output signal of the CCD 25 by correlated double sampling, and an A/D converter which converts the noise-canceled imaging signal to a digital signal. The signal processing circuit 28 outputs the digital imaging signal to the image processor 29.

The image processor 29 performs a process, such as pedestal clamp, on the input imaging signal, and then converts the imaging signal to video data (YUV data) comprising a luminance (Y) signal and a color difference (UV) signal. The image processor 29 also performs digital signal processing on the YUV data to improve the image quality in response to an instruction from the CPU 24. The digital signal processing to improve the image quality includes, for example, auto white balance (AWB) adjustment, contour enhancement, and pixel interpolation.

The YUV data output from the image processor 29 is stored in the SDRAM 30 piece by piece.

In record mode, every time one frame of image data is stored in the SDRAM 30, the one frame of image data is converted to a video signal which is in turn sent to the monitor 15. The monitor 15 displays the video signal as a through image on the display screen 15a.

In record mode, image data of the object image acquired by the CCD 25 is temporarily stored in the SDRAM 30, triggered by the manipulation of the shutter key 5, is compressed by the CPU 24, and is finally recorded in the external memory 31 as a still picture file of a predetermined format.

In response to the user's operation, in playback mode, the still picture file stored in the external memory 31 is read out and expanded by the CPU 24, is developed into the SDRAM 30 as YUV data, and is then displayed on the monitor 15.

The key input unit 32 includes the power key 4, the shutter key 5, the REC key 8 and the PB key 9. When the user manipulates any one of the operational keys, the key input unit 32 sends an operational signal according to the operational contents to the CPU 24.

A built-in clock 33 has a calendar function. The built-in clock 33 generates time information indicating the current time, and calendar information indicating the date and the day of the week, and sends those information to the CPU 24.

The flash memory 34 is a non-volatile memory which stores various programs (including AE, AF and AWB control programs) to allow the CPU 24 to control the individual components and various kinds of data. The flash memory 34 also stores programs that allow the CPU 24 to execute a display control process, a setting process, a display sequence setting process, an image generating process, an acquisition process, a retrieve process, a change-over process, an auto setting process, and a record control process (all of which will be discussed later) in scene select mode. The flash memory 34 stores setting information on the operation of the digital camera which is adequately set or selected by the user, whenever needed.

Figures 3A, 3B:
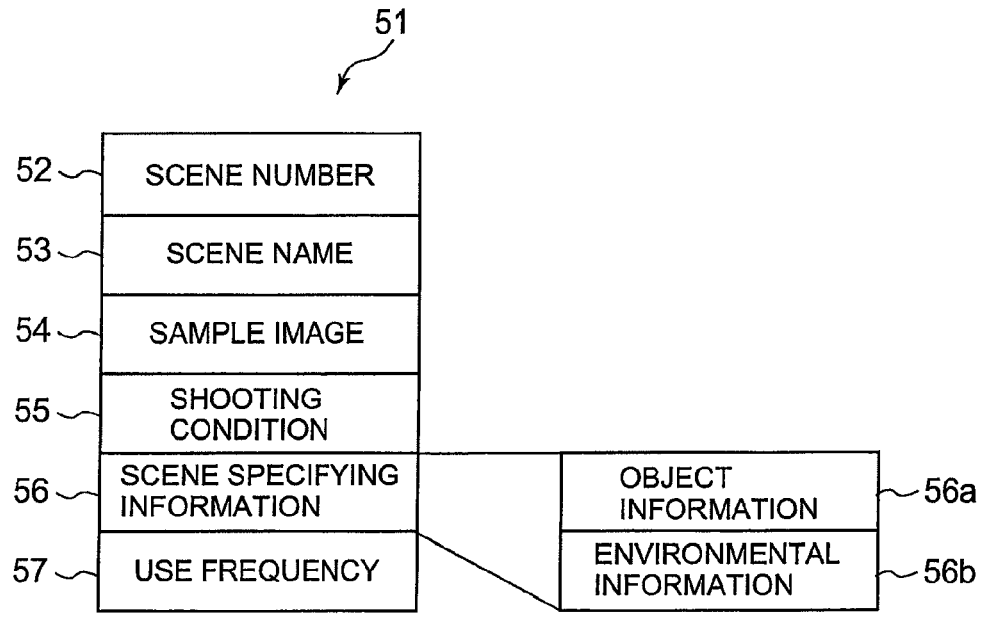
FIG. 3A is a conceptual diagram showing the structure of scene data.
FIG. 3B is a diagram showing an example of information items which constitute object information and environmental information, and values settable according to the information items.

The flash memory 34 also stores multiple pieces of scene data which are used in the scene select mode. Difference pieces of scene data 51 are prepared in association with a plurality of presupposed shooting scenes. Each scene data 51 includes scene number data 52 for data management, scene name data 53, sample image data 54, shooting condition data 55, scene specifying information 56 and use frequency data 57, as shown in FIG. 3A.

The sample image data 54 is displayed on the monitor 15 at the time of selecting a scene in scene select mode. The sample image data 54 is data of sample images indicating multiple shooting scenes, such as various portraits, two-shot having two persons side by side, person and scenery, mountain bathed in evening sunlight, theme park, city in night scene, pet, flower garden, and close-up.

The shooting condition data 55 is setting data of shooting conditions to obtain a shooting result equivalent to a corresponding sample image. More specifically, the shooting condition data 55 is parameters indicating setting contents of a plurality of control items which can be controlled at the time of shooting, such as focus position, shutter speed, aperture, EV (Exposure Value) shift amount, sensitivity, color balance, enhancement color and presence/absence of fill light.

The scene specifying information 56 is information that specifies a shooting scene which should desirably be controlled according to the shooting condition data 55 at the time of shooting. The scene specifying information 56 is used as retrieval information for retrieving a shooting condition and a sample image which has a high probability of matching a shooting scene for the object. The scene specifying information 56 includes object information 56a and environmental information 56b. The object information 56a is information that can be determined (identified) based on image data obtained by the CCD 25 and monitor signals from the motor driver 23, and specifies a condition which matches a shooting scene. The environmental information 56b is information that specifies a condition which can be specified based on information from an information source other than the CCD 25 (e.g., the built-in clock 33) and matches a shooting scene.

FIG. 3B is a diagram showing an example of information items which constitute the scene specifying information 56 (object information 56a and environmental information 56b), and values set according to the information items. As illustrated, the object information 56a includes information of four items "object distance", "motion of object", "brightness of object" and "shooting location". The environmental information 56b includes information of two items "season" and "shooting time". The set value for the "object distance" is "close" or "far", and the set value for the "season" is one of "spring", "summer", "fall" and "winter".

The "object distance" is discriminated based on the position of the lens when image data from the CCD 25 has the highest contrast (when the image data is in focus) in AF control mode. The "lens position" is discriminated based on a monitor signal from the motor driver 23. The "motion of object" is information that is obtained by identifying the difference in the position of a main object between two or more images which are imaged in a predetermined period. For example, whether there is the motion of the object or not, and the degree of the motion can be discriminated by obtaining the difference between luminances of pixels corresponding to two pieces of image data having different shooting timings, and discriminating the distribution of the luminances of the differential images. No values are set for items that are not needed to specify a shooting scene. The number of set values for each item is not limited to one, but a plurality of different values may be set for each item.

The use frequency data 57 indicates the number of times (the frequency of use of) the shooting condition for each piece of scene data has been used in the past.

FIG. 4 shows a specific example of the scene data 51.

Referring to FIG. 4, scene data with scene number 01 has a scene name of "person", and a sample image of a person. Information, such as focus position, shutter speed, aperture, EV shift amount, and sensitivity, is set as the shooting condition. The "object distance" is "close", the "motion of object" is "none", the "brightness of object" is "bright", and "shooting location" is "indoor". With regard to The environmental information has no season set, and the shooting time set to "daytime".

With regard to scene data with scene number 23, the scene name is "scenery", and a sample image is the image of a scenery shot. Information, such as focus position, shutter speed, aperture, EV shift amount, and sensitivity, is set as the shooting condition. The "object distance" is "far", the "motion of object" is "none", the "brightness of object" is "bright", and "shooting location" is "outdoor". With regard to The environmental information has no season set, and the shooting time set to "daytime".

In a case where the user wants to take a typical photograph of one to several persons indoor in scene select mode, for example, viewing the sample image of scene number 01, the user identifies that the sample image matches the shooting scene, and selects the sample image. Likewise, in a case where the user wants to take a picture of an ordinary scenery, such as a distant mountain range in scene select mode, viewing the sample image of scene number 23, the user identifies that the sample image matches the shooting scene, and selects the sample image. As a result, when a sample image is selected, the shooting condition corresponding to the selected sample image is automatically set.

Figure 5A:
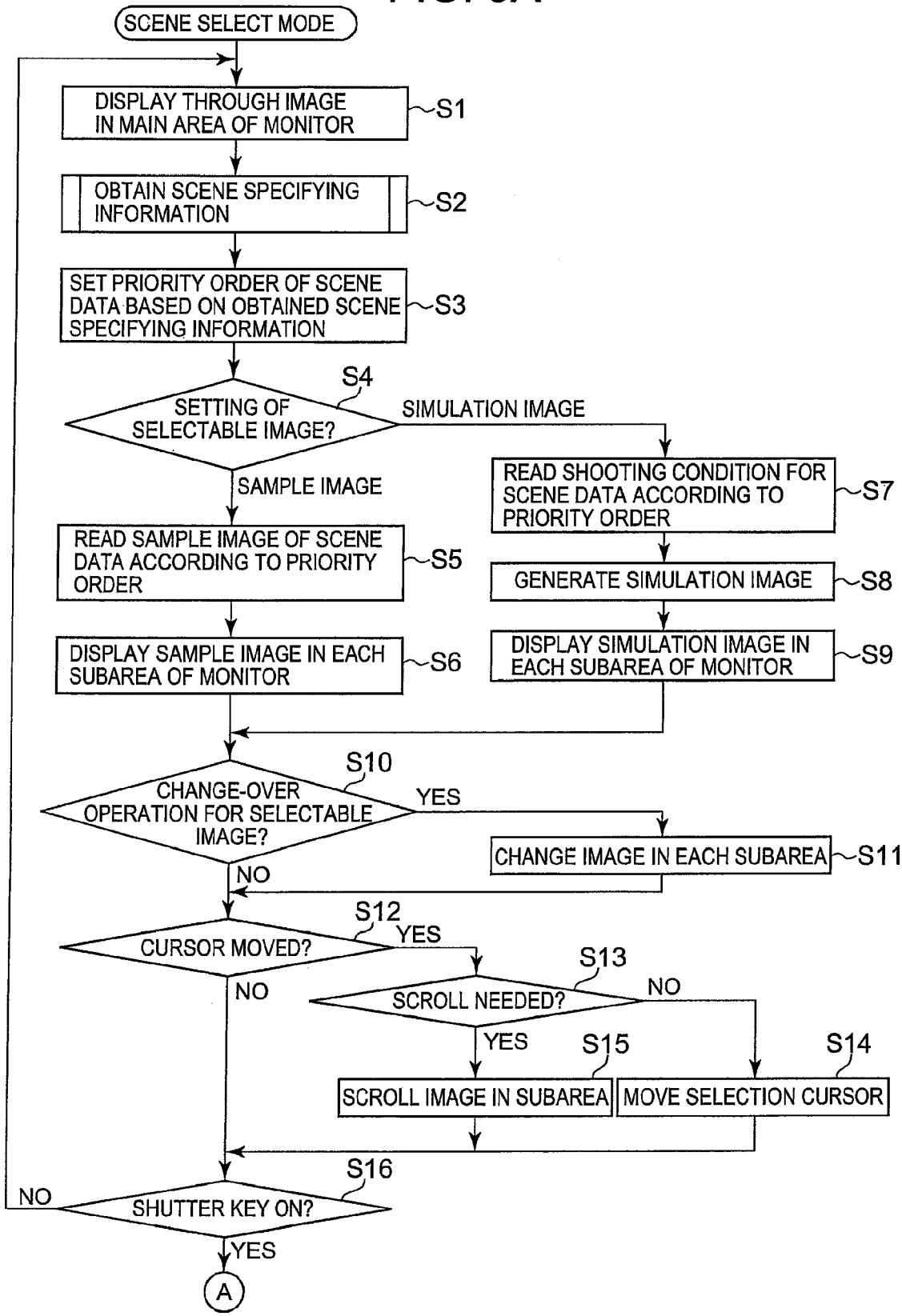
FIGS. 5A and 5B are flowcharts illustrating process procedures of a CPU in record mode when a scene select mode is set.
Figure 5B:
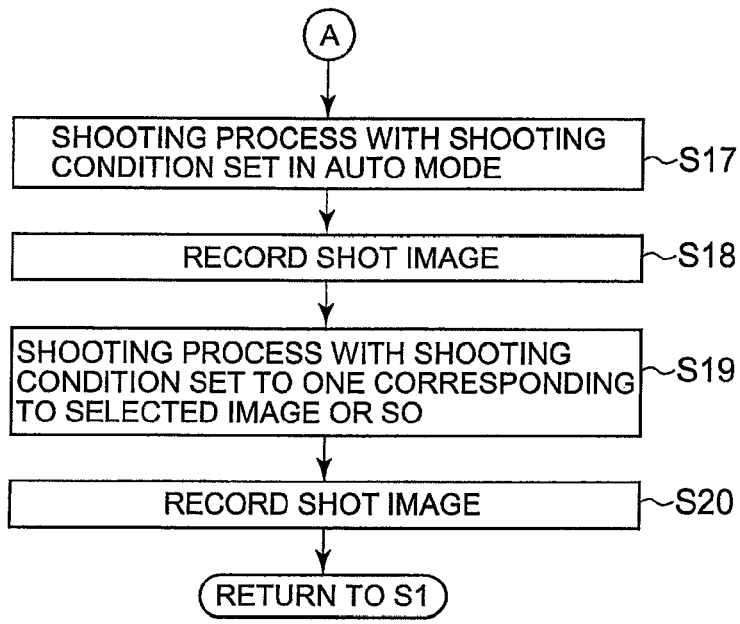
Figure 6:
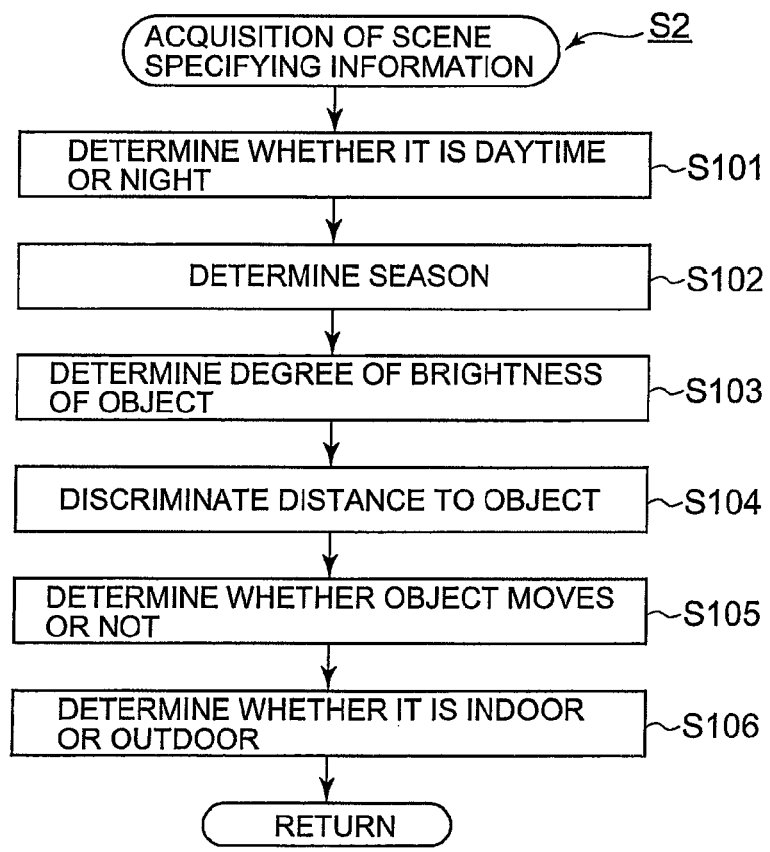
FIG. 6 is a flowchart illustrating a scene specifying information acquisition process.

The operation of the thus-configured digital camera 100 of the invention will be explained below. FIGS. 5A and 5B and FIG. 6 are flowcharts illustrating process procedures of the CPU 24 with the record (shooting) mode set by the user's operating the REC key 8 after the digital camera 100 is powered on and with the scene select mode further set.

The scene select mode is set, for example, as the user operates the menu key 11 to display a menu on the monitor 15, operates the direction key 13 and the SET key 14 to select the scene select mode. In response to the setting, the CPU 24 sets, for example, a flag indicating the scene select mode in the internal memory. The CPU 24 refers to the flag as needed to check if the digital camera 100 is in scene select mode.

With the scene select mode set, the CPU 24 drives the CCD 25 and the CDS/AD 28 at a predetermined frame rate via the timing generator 26, thereby generating image data at a given time interval. The CPU 24 temporarily stores the image data in the SDRAM 30.

In parallel to the shooting operation, the CPU 24 executes the processes shown in FIGS. 5A and 5B. First, the CPU 24 controls the image processor 29 to display a through image (real-time image) based on the shot image in the main area A1 with the display screen 15a of the monitor 15 separated into the main area A1 and the first to third subareas A2a, A2b and A2c as shown in FIG. 7 (step S1).

Next, the CPU 24 obtains scene specifying information. That is, the CPU 24 obtains scene specifying information based on object information (object distance, motion of the object, brightness of the object, shooting location) obtained from the image data temporarily stored in the SDRAM 30 and the monitor signal from the motor driver 23, and environmental information (time information and date information) obtained from the built-in clock 33 (step S2).

Specifically, as shown in FIG. 6, the CPU 24 determines whether it is daytime or night based on the time information from the built-in clock 33 (step S101), determines the present season based on the date information from the built-in clock 33 (step S102), determines the degree of brightness of the object based on the image data stored in the SDRAM 30 (step S103), discriminates the distance to the object (step S104), determines whether the motion of the object is equal to or greater than the criterion motion or not (step S105), determines whether the shooting location is indoor or outdoor (steps S106), and acquires the determination results as scene specifying information.

Subsequently, the CPU 24 sets the priority order of plural pieces of scene data 51 stored in the flash memory 34 based on the obtained scene specifying information (step S3). In this process, for each scene data 51, the CPU 24 sets a higher priority for such scene data 51 whose scene specifying information 56 has a greater number of items whose set values match the state indicated by the scene specifying information obtained in step S2. That is, a higher priority order is given to scene data 51 of a shooting scene which has a higher probability of matching the actual shooting scene. The priority order of scene data with scene specifying information 56 the set values of whose items do not match, at all, the state indicated by the scene specifying information obtained in step S2 is set according to the aforementioned scene number.

Thereafter, the CPU 24 determines which one of a sample image and a simulation image (a presume image) is set as a selectable image to be displayed then (step S4). This determination is carried out based on the parameter indicating the type of a selectable image (to be described later) stored in the internal memory. When a sample image is set as a selectable image (step S4: "Sample Image"), sample image data 54 for the scene data 51 of three kinds of shooting scenes according to the priority order set in step S3 is read out from the flash memory 34 (step S5), and sample images based on the sample image data 54 are displayed as recommendable scenes in the first to third subareas A2a, A2b and A2c of the display screen 15a of the monitor 15 in order from the first subarea A2a according to the priority orders (step S6).

Figure 8A:
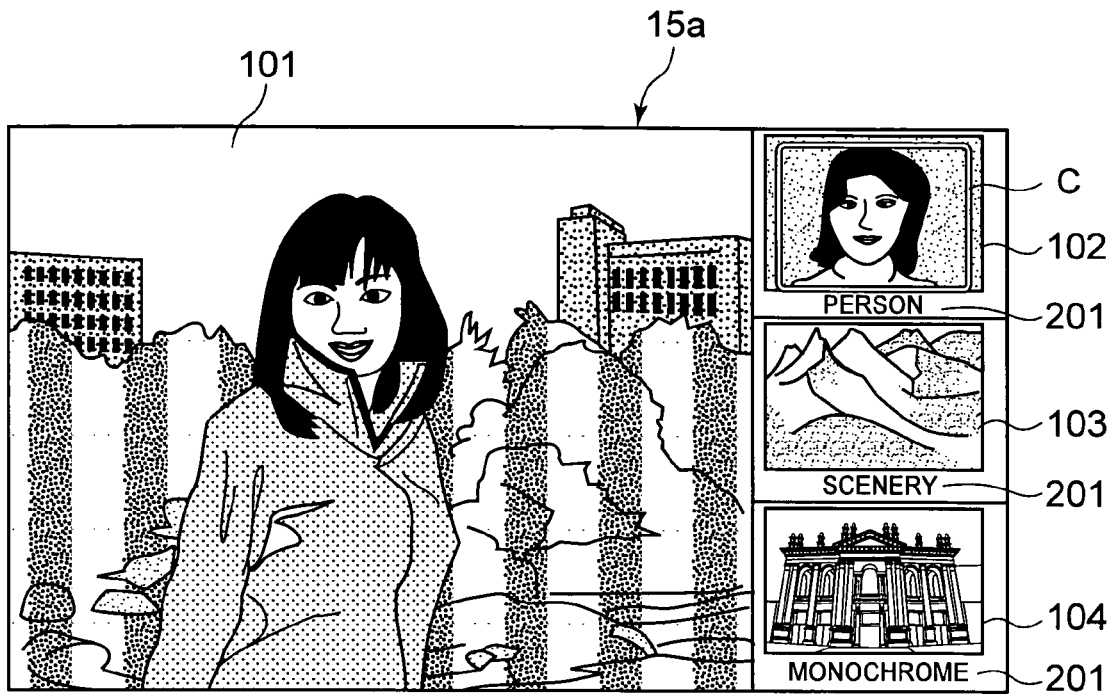

FIG. 8A shows a display example on the display screen 15a when sample images are set as selectable images. As illustrated in FIG. 8A, a through image 101 is displayed in the main area A1 of the display screen 15a, and three sample images 102, 103 and 104 are respectively displayed in the first to third subareas A2a, A2b and A2c in parallel. In the process of step S6, scene names ("person", "scenery", "monochrome") 201 corresponding to the recommendable scenes or the like are displayed in the first to third subareas A2a, A2b and A2c, and a frame-shaped selection cursor C to indicate a selected candidate scene is displayed over any one of the sample images. The display area for the selection cursor C at the beginning of the operation is a preset subarea.

When the CPU 24 determines that scene specifying information which best matches with the scene specifying information obtained from the image data, the time information and the date information is the scene specifying information of scene number 01, and scene specifying information which has the second highest match is the scene specifying information of scene number 23, for example, the CPU 24 displays the sample image and scene name of scene number 01 in the first subarea A2a, and displays the sample image and scene name of scene number 23 in the second subarea A2b.

When the result of the determination in step S4 is "simulation image", a simulation image is set as a selectable image. In this case, the CPU 24 reads the shooting condition data 55 for the scene data 51 of three kinds of shooting scenes according to the priority orders set in step S3 from the flash memory 34 (step S7). Then, the CPU 24 generates or sensitizes simulation (presume) images having the shooting conditions specified by the read shooting condition information reflected on the through image 101 (step S8).

That is, the CPU 24 generates different simulation images by performing different image processes on image data temporarily stored in the SDRAM 30 according to the respective shooting conditions. In the image processing, for example, the CPU 24 increases or decreases the brightness of the image according to the EV shift amount if the EV shift amount is set to a value other than the standard value, and increases or decreases the contrast if set, according to the set contrast. When the shooting condition includes a setting on the tone of the image, such as color filtering, white balance (WB) or color enhancement, the CPU 24 adjusts the tone of the whole image according to the setting. When there is a setting on chrominance enhancement, the CPU 24 increases or decreases the chrominance according to the level of the set chrominance. When the shooting condition includes the setting of sharpness, the CPU 24 performs a filtering process on image data to provide the sharpness according to the degree of the set sharpness. When the shooting condition includes the setting of the shutter speed, the CPU 24 reflects the shooting condition on the through image 101 as much as possible by, for example, increasing or decreasing the brightness of the image or saving a single piece or plural pieces of image data imaged for a through image in the SDRAM 30 or so and superposing those images one on another (in case of slow shutter) before changing the brightness.

Thereafter, the CPU 24 respectively displays the simulation images generated in the above-described manner in the first to third subareas A2a, A2b and A2c, as images indicating recommendable scenes, in order from the first subarea A2a according to the priority orders (step S9).

Figure 8B:
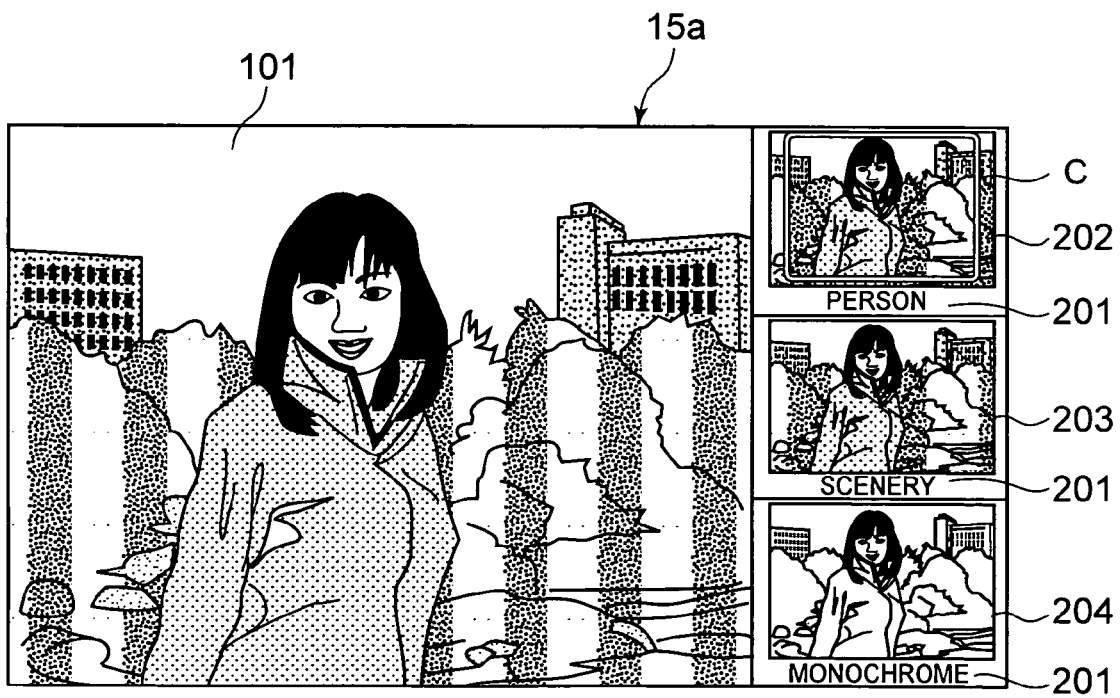

FIG. 8B shows a display example on the display screen 15a when simulation images are set as selectable images. As illustrated in FIG. 8B, a normal through image 101 together with three simulation images 202, 203, 204 are displayed on the display screen 15a at a same time. Provided as in the above-described case of FIG. 8A that scene specifying information which best matches with the scene specifying information obtained from the image data, the time information and the date information is scene specifying information 56 of scene number 01, and scene specifying information which has the second highest match is scene specifying information of scene number 23. Then, the simulation image 202 is obtained by applying the scene specifying information 56 with scene number 01. The simulation image 203 is obtained by applying the shooting condition that is specified by the scene specifying information 56 with scene number 23.

Also In the process of step S8, scene names 201 corresponding to the recommendable scenes or the like are displayed in the first to third subareas A2a, A2b and A2c, and the frame-shaped selection cursor C to indicate a selected candidate scene is displayed over any one of the simulation images. The display area for the selection cursor C at the beginning of the operation is the first subarea A2a preset.

In the shooting standby state with the normal through image 101 and the sample images 102, 103, 104 or the simulation images 202, 203, 204 displayed on the display screen 15a, the CPU 24 checks if there is an instruction to change a selectable image by the operation of a predetermined key like the SET key 14, and proceeds the process to step S12 when there is no such change-over instruction (step S10: NO). When there is the change-over instruction (step S10: YES), the CPU 24 performs setting change the selectable image to be displayed as an image indicating a recommendable scene from a sample image to a simulation image or vice versa (step S11). More specifically, for example, with parameters indicating types of selectable images in the internal memory of the CPU 24, the CPU 24 changes the parameters from one to another. Accordingly, at the next update timing for the through image, the display screen 15a of the monitor 15 changes from, for example, the state shown in FIG. 8A to the state shown in FIG. 8B, or vice versa.

In the shooting standby state, the user can move the selection cursor C in the specified direction by operating the direction key 13. The CPU 24 determines whether the direction key 13 is operated or not (step S112). When the direction key 13 is not operated (step S12: NO), the CPU 24 determines whether or not shooting is instructed by the operation of the shutter key 5 (step S16).

When the direction key 13 is operated, however, the CPU 24 discriminates the specified moving direction of the selection cursor C. Then, the CPU 24 determines whether or not the sample images 102, 103, 104 or the simulation images 202, 203, 204 currently displayed in the first to third subareas A2a, A2b and A2c need to be scrolled based on the moving direction of the selection cursor C (step S13). More specifically, when the selection cursor C is displayed overlying the image 102, 202 in the first subarea A2a at an end of the array of subareas, and when upward movement is instructed by the direction key 13, and when the selection cursor C is displayed overlying the image 104, 204 in the third subarea A2c at an end of the array of subareas, and a downward movement is instructed by the direction key 13, the CPU 24 determines that scrolling is necessary. Otherwise, the CPU 24 determines that scrolling is unnecessary.

When the CPU 24 determines that scrolling is unnecessary (step S13: NO), the CPU 24 moves the selection cursor C in the specified direction (step S14). When the CPU 24 determines that scrolling is necessary (step S13: YES), the CPU 24 scrolls (changes) the sample images 102, 103, 104 or the simulation images 202, 203, 204 currently displayed in the first to third subareas A2a, A2b and A2c with three images as a unit (step S15).

That is, the CPU 24 performs a process of changing all of the sample images 102, 103, 104 (or the simulation images 202, 203, 204) currently displayed in the first to third subareas A2a, A2b and A2c to new three images corresponding to the three types of recommendable scenes with preceding higher priority orders or subsequent lower priority orders. More specifically, for example, the CPU 24 changes the recommendable scenes and performs processes similar to those of steps S4 to S9. To change the images in response to the move-down instruction made by the direction key 13, the display position of the selection cursor C is shifted to the first subarea A2a from the third subarea A2c. To change the images in response to the move-up instruction made by the direction key 13, on the other hand, the display position of the selection cursor C is shifted to the third subarea A2c from the first subarea A2a.

Thereafter, the CPU 24 repeats the above-described processes until a shooting instruction is made by the operation of the shutter key 5 (step S16: NO). When there is a shooting instruction (step S16: YES), the CPU 24 first sets the shooting condition in auto mode and performs a shooting process for an image to be recorded in that state (step S17). The CPU 24 then compresses the resultant data obtained and records the compressed data as a shot image in the external memory 31 (step S18). Thereafter, the shooting condition is set to the shooting condition for the scene corresponding to the sample image 102, 103, 104 currently selected with the selection cursor C displayed overlying the sample image or the simulation image 202, 203, 204 currently selected with the selection cursor C displayed overlying the simulation image. Further, the CPU 24 controls the CCD 25 and the CDS/AD 28 via the timing generator 26 to perform a shooting process for an image to be recorded (step S19). The CPU 24 controls the image processor 29 to compress image data output from the CDS/AD 28, and records the compressed image data as a shot image in the external memory 31 (step S20).

Thereafter, the CPU 24 returns the control to step S1, and repeats the above-described processes until the user cancels the scene select mode or changes the operational mode to another mode like the playback mode.

In scene select mode, as described above, a plurality of selectable images, e.g., three sample images 102, 103, 104 or simulation images 202, 203, 204 displayed in the first to third subareas A2a, A2b and A2c, are displayed together with the normal through image 101 on the display screen 15a. This can allow the user to select an intended image while checking the through image and comparing a plurality of selectable images with one another. Further, the shooting condition corresponding to the selected selectable image is automatically set and image shooting is carried out. What is more, because the normal through image 101 is entirely displayed on the display screen 15a, the digital camera 100 is easier to use.

As mentioned above, the simulation image 202, 203, 204 is both the sample image 102, 103, 104 and its corresponding shooting condition reflected on the through image 101. Accordingly, the user can check an image approximately the same as the shooting result with each shooting condition used before actual shooting by changing a selectable image to be displayed on the display screen 15a to a simulation image as needed. The user can therefore set (select) the intended shooting condition more adequately.

In displaying a plurality of selectable images, as mentioned above, the priority order based on the occasional scene specifying information (plural kinds of object information and environmental information) is set in the scene data 51. Accordingly, images corresponding to shooting scenes having higher probability of matching with the actual shooting scene are displayed on the display screen 15a by priority. This makes it easier for the user to perform a work of selecting an intended selectable image or the shooting condition at the time of shooting.

At the time the user changes selectable images by operating a predetermined key, a plurality of selectable images (three sample images 102, 103, 104 or simulation images 202, 203, 204) are changed to another group of selectable images at a time. Accordingly, the user can efficiently check multiple selectable images with fewer operations, which further facilitates the work of selecting the shooting condition at the time of shooting.

In the shooting standby state, after selecting a desired selectable image, the user can immediately shoot an object under the desired shooting condition by merely pressing the shutter key 5 without any special operation to set the selected state (e.g., the operation of the SET key 14). This can allow the user to more easily perform the work of selecting the shooting condition at the time of shooting. On the other hand, the shooting condition corresponding to the desired selectable image may be set in response to any specific operation (e.g., the operation of the SET key 14) after selecting a desired selectable image and before pressing the shutter key 5. Further, at the time of shooting an object according to the operation of the shutter key 5, shooting under the shooting condition selected by the user (step S19) and shooting under the shooting condition set in auto mode (step S17) are automatically executed. Comparing the shooting results under both shooting conditions with each other after shooting, the user can check the effect of the shooting condition selected (set) by the user.

In the embodiment, the user can adequately change sample images displayed together with the through image 101 to simulation images or vice versa. The invention is not however limited to this change-over style, and a plurality of selectable images may be either sample images or simulation images. Further, only the change-over in the shooting standby state may be disabled so that a user can preset selectable images.

Instead of setting a plurality of selectable images to either sample images or simulation images, both sample images and simulation images may be displayed at the same time as shown in FIG. 9. That is, plural sets of selectable images each set having a sample image and a simulation image may be simultaneously displayed together with the through image 101. In this case, the determination process of step S4 in FIG. 5A is removed and all the processes of steps S5 to S9 are executed.

Figure 10:
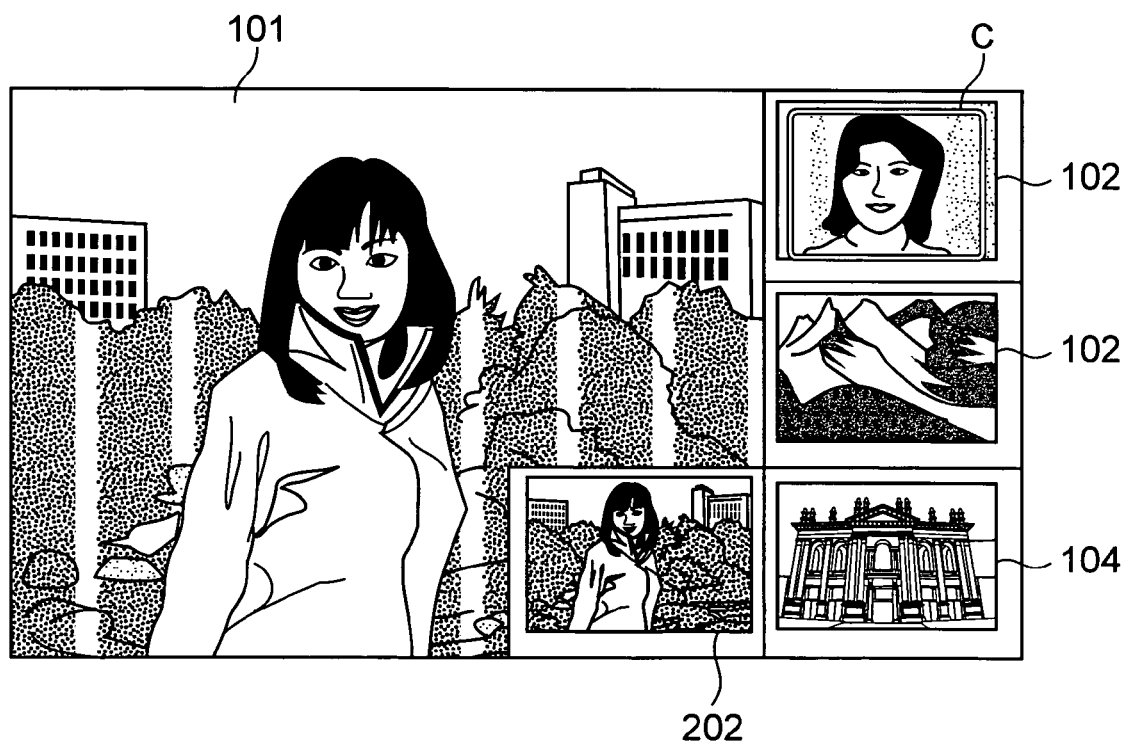
FIG. 10 is a diagram of a display example on the display screen of the monitor, showing a case where three sample images and a simulation image corresponding to a sample image selected by a cursor are displayed together as selectable images.

As shown in FIG. 10, a plurality of sample images 102, 103 may be displayed together and the simulation image 202 which reflects the shooting condition corresponding to the sample image selected with the cursor may be displayed at the same time as the through image 101. In this case, the determination process of step S4 in FIG. 5A is removed and after the processes of steps S5 and S6 are executed, the shooting condition corresponding to the sample image selected with the cursor in step S7 is read out, the simulation images are generated in step S8, and then the resultant image is displayed on the display screen 15a in step S9.

Although images corresponding to shooting scenes having higher probability of matching with the actual shooting scene are displayed on the display screen 15a by priority at the time of displaying a plurality of selectable images in the embodiment, images may be displayed in the order of scene numbers.

With regard to those of individual pieces of scene data 51 whose scene specifying information 56 have individual information items whose set values do not match at all with individual pieces of information in the scene specifying information obtained in step S2, the priority orders may not be set and the display of selectable images corresponding to those pieces of scene data 51 may be inhibited in the process of step S3 in FIG. 5A. That is, it may be possible to display only selectable images for those of individual pieces of scene data 51 whose scene specifying information 56 have individual information items whose set values partly or entirely match with individual pieces of information in the scene specifying information obtained in step S2. In this case, setting the priority orders may be canceled.

It may be possible to retrieve that scene data 51 whose scene specifying information 56 has individual information items whose set values match with individual pieces of information in the scene specifying information obtained in step S2 in the process of step S3, for example, and to display only the image (sample image or simulation image) of the retrieved scene data 51 as an image indicating a recommendable scene in the processes of step S5 and S6 or in the processes of step S7 to S9. That is, only the image (sample image or simulation image) of the scene data 51 corresponding to the shooting scene that is considered as matching with the actual shooting scene may be displayed as a recommendable scene. In this case, the method of determining a shooting scene which matches with the actual shooting scene (the method of retrieving scene data 51) and the method of setting the priority orders are optional.

Although selectable images currently displayed together with the through image 101 can be changed over to another group of selectable images at, the change-over to another group of selectable images may be disabled. Specifically, the maker or the user may preselect plural pieces of representative scene data (scene numbers) from previously prepared multiple pieces of scene data within the range of the maximum number of selectable images displayable together with the through image 101, so that only those selectable images which correspond to the selected plural pieces of representative scene data can be displayed together with the through image 101. In this case, however, it is necessary to provide another scene select mode in addition to the scene select mode of the present invention, and to allow the user to select desired scene data from previously prepared multiple pieces of scene data.

Although selectable images currently displayed together with the through image 101 are changed over to another group of selectable images at a time in response to the change-over instruction made by the user's operating a predetermined key, the change-over method is not limited to this type, and selectable images may be changed over one by one. That is, when the move-down instruction is made by the direction key 13, the selectable images (sample images or simulation images) displayed in the first to third subareas A2a, A2b and A2c may be changed to selectable images of a shooting scene (scene data 51) whose priority order is lower by one, whereas when the move-up instruction is made by the direction key 13, the selectable images (sample images or simulation images) displayed in the first to third subareas A2a, A2b and A2c may be changed to selectable images of a shooting scene (scene data 51) whose priority order is higher by one. In this case, the display position of the selection cursor C need not be changed.

In the embodiment, the display screen 15a is separated into the main area A1 and the subareas A2a, A2b and A2c smaller than the main area A1, and the through image 101 is displayed in the main area A1, and images for selecting a scene are displayed in the subareas A2a, A2b and A2c. However, all the areas may have the same size. The sizes of the subareas may be designed to differ from one another. For example, the subarea A2a with a high priority order may be made larger than the other subareas, or the sizes of the subareas may be increased (reduced) according to the priority orders. The number and layout of the simulation images 202, 203, 204 (the number of the subareas A2a, A2b and A2c) may be changed as needed.

Although the foregoing description has been given of the case where the monitor 15 has the display screen 15a having an aspect ratio (9:16) laterally larger than the aspect ratio (3:4) of the normal screen, the display screen 15a of the monitor 15 should not necessarily be laterally longer and the invention can be worked out when the display screen of the monitor has the normal aspect ratio.

The size of each image is optional. For example, FIG. 11 exemplifies a screen structure where the aspect ratio of each image is set to 9:16, and the number of subareas A2a to A2f is set to "6".

At the time of shooting an object in response to the operation of the shutter key 5, shooting under the shooting condition selected by the user and shooting under the shooting condition selected in auto mode are automatically executed. However, shooting under the shooting condition selected in auto mode may be canceled or the user may optionally select whether or not to execute such shooting.

Although the foregoing description has been given of the case where the invention is adapted to a digital camera, the invention is not restrictive to this case, but can easily adapted to a camera-equipped cellular phone terminal, a camera-equipped PDA (Personal Digital Assistant), a camera-equipped personal computer and so forth which operate as a camera apparatus having an imaging device, such as CCD, and a monitor device.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2006-9889 filed on Jan. 18, 2006 and including specification, claims, drawings and summary. The disclosure of the above Japanese Patent Application is incorporated herein by reference in its entirety.

What is claimed is:

1. A camera apparatus comprising:
an imaging unit that shoots an object and outputs image data thereof;
a display unit that displays an image;
a storage unit that stores a plurality of shooting conditions;
a display control unit that displays on a display screen of the display unit a real-time image based on the image data from the imaging unit together with a plurality of selectable images for identifying the plurality of shooting conditions stored in the storage unit, wherein the display control unit includes an image changing unit that changes the selectable images to be displayed together with the real-time image in response to a predetermined operation;
a selection unit that selects an arbitrary one of the selectable images displayed on the display unit;
a setting unit that sets one of the shooting conditions stored in the storage unit which corresponds to the selectable image selected by the selection unit as a shooting condition for a shooting operation;
a recording unit that causes the imaging unit to shoot the object according to the shooting condition set by the setting unit, and records obtained image data;
a scene specifying information obtaining unit that obtains scene specifying information for specifying a shooting scene when the object is shot; and
a priority order setting unit that sets a priority order for the shooting conditions stored in the storage unit, based on the scene specifying information obtained by the scene specifying information obtaining unit;
wherein the image changing unit changes the selectable images to be displayed on the display unit together with the real-time image according to the priority order set by the priority order setting unit.

2. A camera apparatus comprising:
an imaging unit that shoots an object and outputs image data thereof;
a display unit that displays an image;
a storage unit that stores a plurality of shooting conditions;
a display control unit that displays on the display unit a real-time image based on the image data from the imaging unit together with a plurality of selectable images for identifying the plurality of shooting conditions stored in the storage unit;
a selection unit that selects an arbitrary one of the selectable images displayed on the display unit;
a setting unit that sets one of the shooting conditions stored in the storage unit which corresponds to the selectable image selected by the selection unit as a shooting condition for a shooting operation;
a recording unit that causes the imaging unit to shoot the object according to the shooting condition set by the setting unit, and records obtained image data; and
a presumed image generating unit that generates a presumed image indicating a shooting result presumed when each of the shooting conditions stored in the storage unit is set as the shooting condition at a time of shooting the object, based on image data output from the imaging unit;
wherein the display control unit displays a plurality of presumed images generated by the presumed image generating unit as the plurality of selectable images, together with the real-time image on the display unit.

3. The camera apparatus according to claim 2, wherein the storage unit stores each of the shooting conditions and a sample image representing a suitable shooting scene to which the shooting condition is applied in association with each other, and the display control unit includes a change-over unit that changes the selectable images to be displayed together with the real-time image on the display unit between sample images stored in the storage unit and the presumed images generated by the presumed image generating unit in response to a user's operation.

4. A camera apparatus comprising:
an imaging unit that shoots an object and outputs image data thereof;

a display unit that displays an image;

a storage unit that stores a plurality of shooting conditions;

a display control unit that displays on the display unit a real-time image based on the image data from the imaging unit together with a plurality of selectable images for identifying the plurality of shooting conditions stored in the storage unit, wherein the display control unit displays an array of the selectable images on the display unit and a cursor designating one of the selectable images on the display unit, and moves the cursor in response to a user's operation;

a selection unit that selects an arbitrary one of the selectable images displayed on the display unit;

a setting unit that sets one of the shooting conditions stored in the storage unit which corresponds to the selectable image selected by the selection unit as a shooting condition for a shooting operation;

a recording unit that causes the imaging unit to shoot the object according to the shooting condition set by the setting unit, and records obtained image data; and a presumed image generating unit that generates a presumed image indicating a shooting result presumed when each of individual shooting conditions stored in the storage unit which corresponds to the selectable image designated by the cursor is set as the shooting condition at a time of shooting the object, based on image data output from the imaging unit;

wherein the display control unit displays the real-time image, the selectable images and the presumed image generated by the presumed image generating unit on the display unit at a same time.

5. An imaging method for operating a camera apparatus, the method comprising:

shooting an object and outputting image data thereof;

displaying a real-time image based on the output image data together with a plurality of selectable images for identifying a plurality of shooting conditions;

changing the selectable images to be displayed together with the real-time image in response to a predetermined operation;

selecting an arbitrary one of the displayed selectable images;

setting one of the shooting conditions which corresponds to the selected image as a shooting condition for a shooting operation;

shooting the object according to the set shooting condition, and recording obtained image data;

obtaining scene specifying information for specifying a shooting scene when the object is shot; and setting a priority order for the shooting conditions based on the obtained scene specifying information;

wherein the selectable images to be displayed together with the real-time image are changed according to the set priority order.

6. An imaging method for operating a camera apparatus, the method comprising:

shooting an object and outputting image data thereof;

displaying a real-time image based on the output image data together with a plurality of selectable images for identifying a plurality of shooting conditions;

selecting an arbitrary one of the displayed selectable images;

setting one of the shooting conditions which corresponds to the selected image as a shooting condition for a shooting operation;

shooting the object according to the set shooting condition, and recording obtained image data; and generating a presumed image indicating a shooting result presumed when each of the shooting conditions is set as the shooting condition at a time of shooting the object, based on the output image data;

wherein a plurality of generated presumed images are displayed as the plurality of selectable images together with the real-time image.

7. An imaging method for operating a camera apparatus, the method comprising:

shooting an object and outputting image data thereof;

displaying a real-time image based on the output image data together with an array of a plurality of selectable images for identifying a plurality of shooting conditions and a cursor designating one of the selectable images, wherein the cursor is moved in response to a user's operation;

selecting an arbitrary one of the displayed selectable images;

setting one of the shooting conditions which corresponds to the selected image as a shooting condition for a shooting operation;

shooting the object according to the set shooting condition, and recording obtained image data; and generating a presumed image indicating a shooting result presumed when each of individual shooting conditions which corresponds to the selectable image designated by the cursor is set as the shooting condition at a time of shooting the object, based on output image data output from the imaging unit;

wherein the real-time image, the selectable images and the generated presumed image are displayed at a same time.

* * * * *